(12) United States Patent
Suzuki

(10) Patent No.: US 7,343,420 B2
(45) Date of Patent: Mar. 11, 2008

(54) DATA CONTENTS DISTRIBUTION SYSTEM

(75) Inventor: Masahiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 858 days.

(21) Appl. No.: 10/458,206

(22) Filed: Jun. 11, 2003

(65) Prior Publication Data

US 2003/0233426 A1    Dec. 18, 2003

(30) Foreign Application Priority Data

Jun. 14, 2002    (JP) .............................. 2002-175004

(51) Int. Cl.
*G06F 15/16* (2006.01)
(52) U.S. Cl. .......................... 709/231; 709/219; 725/1; 705/20
(58) Field of Classification Search ................ 709/203, 709/219, 231; 705/26, 20; 725/1
See application file for complete search history.

(56) References Cited

U.S. PATENT DOCUMENTS

| 6,557,042 B1* | 4/2003 | He et al. ..................... 709/231 |
| 7,113,983 B1* | 9/2006 | Terada et al. ................ 709/219 |
| 2002/0010740 A1* | 1/2002 | Kikuchi et al. ............. 709/203 |
| 2002/0147661 A1* | 10/2002 | Hatakama et al. ............ 705/26 |
| 2003/0023505 A1* | 1/2003 | Eglen et al. .................. 705/26 |
| 2005/0267819 A1* | 12/2005 | Kaplan ........................ 705/26 |

FOREIGN PATENT DOCUMENTS

| JP | 10-326119 A | 12/1998 |
| JP | 2001-22670 A | 1/2001 |
| JP | 2001-92705 A | 4/2001 |
| JP | 2001-222643 A | 8/2001 |
| JP | 2002-25184 A | 1/2002 |
| JP | 2002-133309 A | 5/2002 |
| WO | WO 01/71585 A1 | 9/2001 |
| WO | WO 02/46961 A1 | 6/2002 |

* cited by examiner

*Primary Examiner*—William Vaughn
*Assistant Examiner*—Djenane Bayard
(74) *Attorney, Agent, or Firm*—Sughrue Mion, PLLC

(57) ABSTRACT

A data contents distribution system in which a contents distribution server puts contents and trial contents of the contents in question on a Web site on a network and a client side device of a user reproduces the trial contents to confirm the details of the contents before obtaining the contents, which includes a function of detecting the number of requests for reproduction of trial contents made by a user or a reproduction time of trial contents, a contents estimation function of determining user's estimation of the contents based on the detection result, and a function of feeding back the estimation result to the relevant contents on the Web site.

2 Claims, 2 Drawing Sheets

DATA CONTENTS DISTRIBUTION SYSTEM

BACKGROUND OF THE INVENTION

1. Field of the Invention

The present invention relates to a data distribution system for distributing such contents as music and moving picture for pay and, more particularly, to a data contents distribution system which distributes trial contents by using a streaming technique to enable a client to order the distribution of the contents upon confirming its details.

2. Description of the Related Art

In a case of distributing such contents as music and moving picture through a network for pay, it is a conventional practice that a provider of the contents prepares contents for trial listening or viewing on its Web page and conducts streaming distribution for free to a client who desires trial. With such a system, a client is allowed to order actual contents after listening and viewing to a part of the contents on trial and confirming its details. Purchase price of each content is presented on a Web page, so that when making an order, a user checks the price to purchase the contents.

Conventional contents distribution systems, however, have a problem that because a contents provider side unilaterally determines a contents price, it is difficult for the price of the content in question to precisely reflect actual valuation of the same in the market. In other words, content which is highly popular in the market and content which is otherwise are bought and sold at prices that a provider uniformly determines.

SUMMARY OF THE INVENTION

An object of the present invention is to provide a data contents distribution system capable of automatically setting a price which reflects the degree of popularity among clients of trial contents and clients' interest in contents.

According to the first aspect of the invention, a data contents distribution system in which a contents distribution server puts contents and trial contents of the contents in question on a Web site on a network and a client side device of a user reproduces the trial contents to confirm the summaries or the details of the contents before obtaining the contents, wherein the contents distribution server comprises a contents distribution element which conducts streaming-distribution of at least the trial contents, a detection element which detects the degree of user's interest in trial contents, a contents estimation element which determines user's estimation of the contents based on an output of the detection elements, and a feed back element which feeds back estimation determined by the contents estimation element to the relevant contents on the Web site.

Thus, the system of the present invention is designed to detect, by means of a data distribution server, the number of times that clients make a request for the reproduction of contents to be listened or viewed on trial or time consumed for the reproduction of contents to be listened or viewed on trial, so that clients' estimation of contents to be listened or viewed on trial is determined based on the number of requests for reproduction or on the reproduction time to feed back the estimation to displays of the contents on a Web site. In other words, when the number of times clients make a request for reproduction of contents to be listened or viewed on trial is large, or when much time is cost by clients for the reproduction of contents to be listened or viewed on trial, it can be considered that the clients have sufficient interest in the contents in question and when the number of requests made for reproduction is small or even when a reproduction request is made, if the reproduction time is short, it can be considered that the clients have less interest.

It is accordingly possible to make a contents price on a Web site or displays of the degree of popularity directly reflect clients' estimation by feeding back recognition results of the number of reproduction requests or the reproduction time to displays of the contents.

According to the second aspect of the invention, a data contents distribution system in which a contents distribution server puts contents and trial contents of the contents in question on a Web site on a network and a client side device of a user reproduces the trial contents to confirm the summaries or the details of the contents before obtaining the contents, wherein the contents distribution server comprises a contents distribution element which conducts streaming-distribution of at least the trial contents, a detection element which detects the number of requests for reproduction of trial contents made by the client side device or a reproduction time of the trial contents, a contents estimation element which determines user's estimation of the contents based on an output of the detection element, and a feed back element which feeds back estimation determined by the contents estimation element to the relevant contents on the Web site.

In the preferred construction, the data contents distribution system further comprises an element which automatically transmits a trial contents reproduction stop signal to the data contents distribution server, when the client device stops reproduction of trial contents, wherein the distribution server recognizes a reproduction time of the trial contents when the distribution server detects the reproduction stop signal.

By thus arranging the system to automatically transmit a contents reproduction stop signal, contents displays can be made to reflect clients estimation without making users conduct special operation.

In another preferred construction, the contents distribution server includes a count element which counts the number of requests for distribution of trial contents made by the client side device.

According to another aspect of the invention, a data contents distribution server which puts contents and trial contents of the contents in question on a Web site on a network, comprises a Web site which puts contents to be distributed to a client side device of a user and trial contents of the contents in question on the network, a contents distribution element which conducts streaming-distribution of at least the trial contents, a detection element which detects the degree of the user's interest in the trial contents, a contents estimation value determination element which determines an estimation value of the trial contents based on an output of the detection element, and an update element which updates estimation of contents on the Web site based on an output of the contents determination element.

According to another aspect of the invention, a data contents distribution server which puts contents and trial contents of the contents in question on a Web site on a network, comprises a Web site which puts contents to be distributed to a client side device of a user and trial contents of the contents in question on the network, a data distribution element which conducts streaming-distribution of at least the trial contents, a detection element which detects the number of requests for reproduction of the trial contents made by the user or a reproduction time of the trial contents, a contents estimation value determination element which determines an estimation value of the trial contents based on an output of the detection element, and an update element which updates estimation of contents on the Web site based on an output of the determination element.

In the preferred construction, the data contents distribution server comprises a estimation data base element which stores the estimation value, a sum element which sums estimation based on value of the estimation data base every a fixed time, and an update element which updates the summed estimation on the Web site.

In another preferred construction, the data contents distribution server comprises a receive element which receives a trial contents reproduction stop signal transmitted from the client side device when reproduction of trial contents is stopped, and a recognition element which recognizes a reproduction time of the trial contents when the stop signal detects.

In another preferred construction, the data contents distribution server further comprises a count element which counts the number of requests for distribution of trial contents made by the client side device.

According to another aspect of the invention, a data contents distribution program to be executed on a data contents distribution server which puts contents and trial contents of the contents in question on a Web site on a network, which executes the function of putting contents to be distributed to a client side device of a user and trial contents of the contents in question on a Web site on the network, the function of conducting streaming-distribution of at least the trial contents, the function of detecting the number of requests for reproduction of the trial contents made by the user or a reproduction time of the trial contents, the contents estimation value determination function of determining an estimation value of the trial contents based on an output of the detection function, and the function of updating estimation of contents on the Web site based on an estimation value of the contents.

According to another aspect of the invention, a data contents reproduction program to be executed on a client side device which is communicable with a data contents distribution server through the network, which executes the function of reproducing contents and trial contents distributed by the data contents distribution server by using streaming, and the function of sending a reproduction stop signal to the data distribution server automatically when the trial contents stop streaming.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
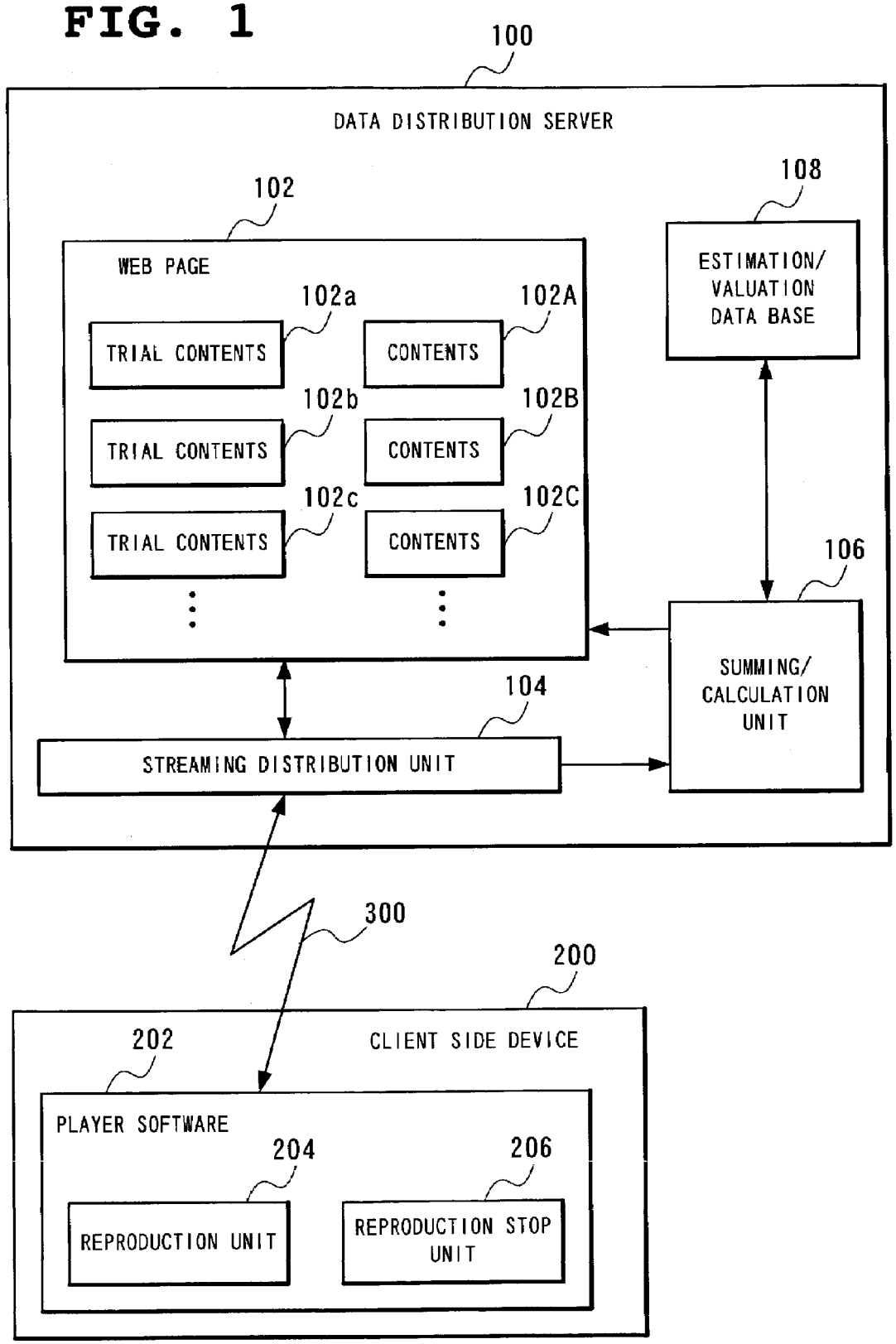
FIG. 1 is a block diagram showing a structure of a data contents distribution system of the present invention.

FIG. 1 is a diagram showing a structure of the contents distribution system of the present invention. As shown in FIG. 1, the present system is composed of a data distribution server 100 for streaming-distributing such contents as music and moving picture to a client for pay, a client side device 200 for taking in contents distributed from the distribution server 100 and reproducing the same, and a network 300 which connects the distribution server 100 and the client side device 200.

The server 100 has a Web page 102 to appear at a Web site on the network 300, a streaming distribution unit 104 for conducting streaming of contents on the Web page 102, a summing/calculation unit 106 for summing up information from the streaming distribution unit 104 to calculate estimation and valuation of each content, and an estimation/valuation data base 108 for preserving estimation and valuation of each content summed up and calculated by the summing/calculation unit 106.

The Web page 102 has contents for user 102A, 102B and 102C . . . thereon which are presented to clients for pay. On the Web page 102, price of each of these contents is displayed. In addition, for each content, each of trial contents 102a, 102b, 102c . . . is presented and the streaming distribution unit 104 is designed to conduct streaming of these trial contents for free in response to a client's request, thereby allowing the client to confirm the details before purchasing the contents.

On the other hand, the client side device 200 is communicable with the server 100 through the network 300 and has player software 202 for reproducing contents (or trial contents) distributed by streaming from the server 100. The player software 202 includes contents reproduction unit 204 and reproduction stop unit 206 by which reproduction operation can be forcibly ended during the reproduction of the contents. More specifically, a user makes the contents reproduction unit 204 cause the streaming distribution unit 104 to start contents streaming and when he/she needs to stop distribution midway through the operation, makes the reproduction stop unit 206 transmit a contents distribution stop instruction to the streaming distribution unit 104 to forcibly end the reproduction.

The summing/calculation unit 106 calculates a reproduction time of trial contents based on a distribution start instruction and a distribution stop instruction sent from the client 200 to the streaming distribution unit 104, calculates an estimation mark of each content and registers the same in the estimation/valuation data base 108 to sequentially update the data base.

After a lapse of a fixed time, the summing/calculation unit 106 takes out an estimation mark registered in the estimation/valuation data base 108 and based on the same, updates display information (estimation value such as price) of each content on the Web page 102.

Although not illustrated in the figure, the data distribution server 100 has a program which describes a procedure for executing the above-described operation and executes by means of the CPU.

Next, operation of the data distribution system of the present invention will be more specifically described with reference to the flow chart shown in FIG. 2.

First, on the client 200, a user reads the Web page 102 of the server 100 by using a Web browser or the like. Put on the Web page 102 are the contents 102A, 102B, 102C which are distributable for pay.

For each content, each of the trial contents 102*a*, 102*b*, 102*c* . . . is presented for free to listen or view by streaming trial contents in response to a client's request.

Users are allowed to stop reproduction by the reproduction stop unit 206 any time during contents reproduction and when the reproduction of trial contents is stopped, the player software 202 automatically transmits a distribution stop instruction to the streaming distribution unit 104 of the server 100 to stop streaming.

Figure 2:
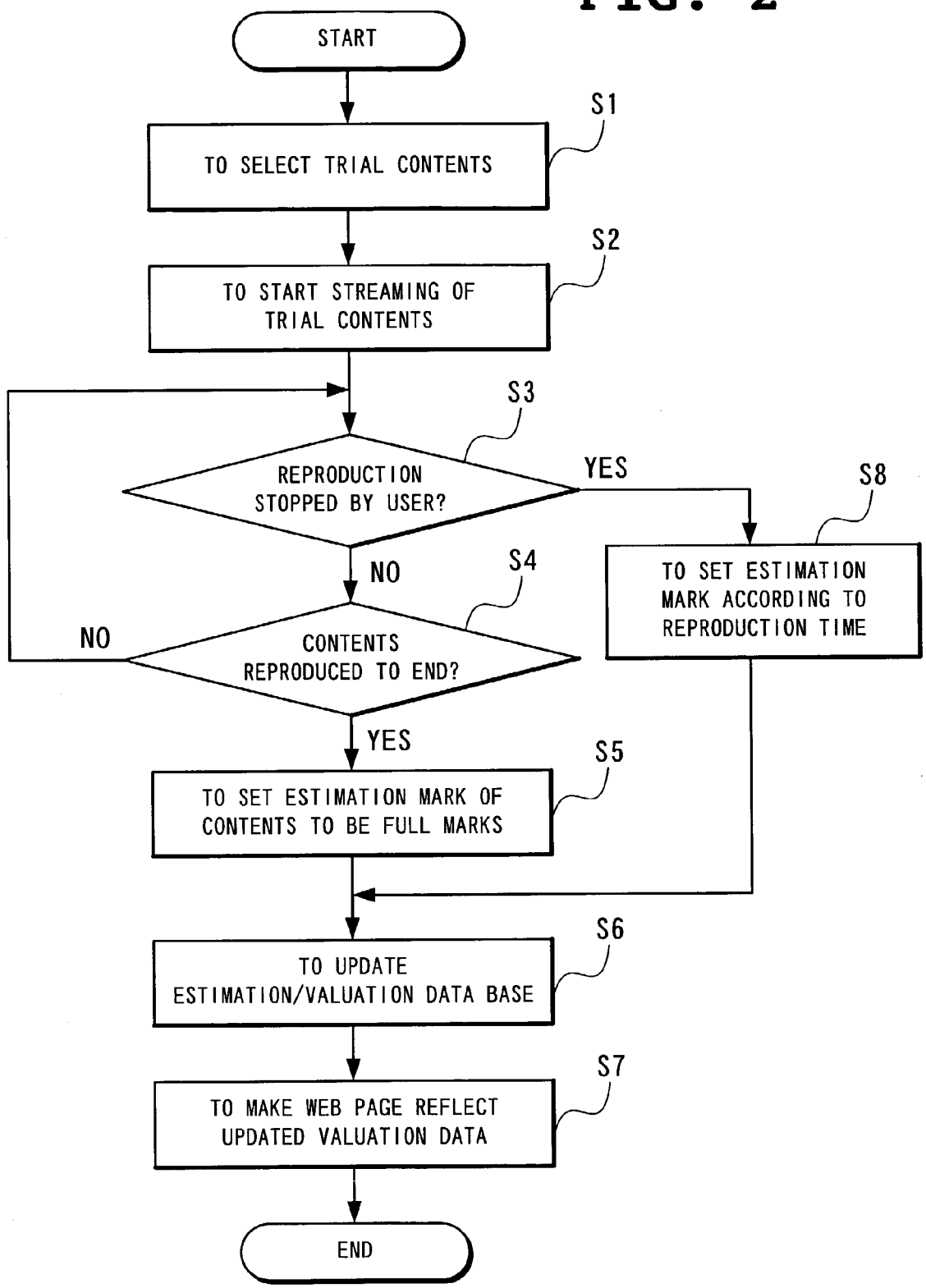
FIG. 2 is a flow chart showing an operation procedure in the data contents distribution system of the present invention.

With reference to FIG. 2, a user (client 200) accesses the Web page 102 of the server 100 through the network 300 to select trial contents which the user wants to listen to or to view on trial and makes a request for streaming distribution (Step S1).

In response to the request, the server 100 starts streaming of the selected trial contents for the client 200 (Step S2).

The streaming distribution unit 104, which is checking whether the client 200 stops reproduction of the trial contents or not (Step S3) and whether the trial contents have been reproduced to the end or not (Step S4), when the reproduction is not stopped by a user (Step S3: NO, Step S4: YES), sets the estimation mark of the contents in question to be full marks (Step S5) and updates the estimation mark of the contents in question at the estimation/valuation data base 108 to be full marks (Step S6).

On the other hand, when reproduction of the trial contents is stopped midway at the client 200 (Step S3, YES), the server 100 calculates a time from the start of streaming distribution until the reception of a reproduction stop signal, that is, a time cost by the user to reproduce the trial contents, and calculates an estimation mark according to the calculated time (Step S8) to update the estimation mark of the contents in question in the estimation/valuation data base 108 (Step S6).

After a lapse of a fixed time, update a price of each content on the Web page 102 based on the estimation mark of the trial contents in the sequentially updated data base 108 (Step S7) to make contents price setting automatically reflect user's reaction to each content.

More specifically, when a user has no interest in trial contents, it can be expected that the user will immediately stop the trial by using the reproduction stop unit 206 of the player software 202 and it can be simply expected that the longer the trial listening/viewing time of trial contents becomes, the more interest the user in question will have in the contents.

Therefore, by setting an estimation mark of the contents calculated by the summing/calculation unit 106 to be higher (or lower) as a time of user's trial listening/viewing of the trial contents, that is, a reproduction time, becomes longer, user's estimation can be used for price setting. For example, reproduction to the last of trial contents may be given the estimation mark ten as full marks and 50% reproduction of the contents may be given the estimation mark five. The estimation mark may be increased or decreased simply in proportion to a reproduction time or may be adjusted by adding a bonus point when the contents are reproduced to the end, for example, or adding a minus point when the reproduction time is not more than 10%.

By thus converting reproduction information about trial contents sent from the client 200 into an estimation mark indicative of popularity of the contents in question and recording the mark in the estimation/valuation data base 108, the summing/calculation unit 106 makes contents prices put on the Web page 102 reflect the estimation marks after a lapse of a fixed time.

In a case, for example, where with one week as a summing period, a total of estimation marks of the contents 102A is one and a half times the total of the estimation marks of the contents 102B in the same period, determination will be made that the contents 102A have valuation one and a half times higher than that of the contents 102B to reset the price such that a price ratio of the contents 102A to the contents 102B is 1.5:1 and put the new price information on the Web page 102.

Methods of summing up estimation marks or methods of making prices reflect estimation marks have variations.

For example, although in the above-described example, a trial contents reproduction time is measured to calculate an estimation mark, the number of times that trial listening/viewing content is selected may be counted as a basis for estimation in addition to a reproduction time or separately from a reproduction time. In other words, content that is selected by many users can be considered to be highly popular among the users. The number of times that trial contents distribution requests are made can be counted by the streaming distribution unit 104.

Although in the above-described example, the system is structured to make a contents price reflect client's estimation, it may be structured to display popularity ranking of each content and make not always limited to price but the displays reflect the estimation.

As described in the foregoing, according to the structure of the present invention, it is possible to make displays of each content on a Web page automatically reflect client's estimation of contents, so that price setting, popularity ranking and the like can be properly and appropriately conducted accordingly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A data contents distribution system comprising:
    a contents distribution server which puts contents and trial contents of the contents in question on a Web site on a network and
    a client side device which reproduces said trial contents to confirm the summaries or the details of the contents before obtaining the contents,
    wherein said contents distribution server comprises:
        a contents distribution element which conducts streaming-distribution of at least said trial contents,
        a detection element which detects and outputs a degree of user's interest in trial contents,
        a contents estimation element which determines a user's estimation of said contents based on the output of said detection element, and
        a feed back element which feeds back the user's estimation determined by said contents estimation element to the relevant contents on said Web site, wherein said client side device comprises:
- an element which automatically transmits a trial contents reproduction stop signal to said data contents distribution server, when said client device stops reproduction of trial contents,
- wherein said detection element in said distribution server recognizes a reproduction time of said trial contents when said detection element detects the reproduction stop signal, and the detection element detects the degree of user's interest in said trial contents based on the reproduction time of said trial contents.

2. A data contents distribution server comprising:
- a Web site which puts contents and trial contents of the contents in question on a network to be distributed to a client side device, wherein the client side device reproduces said trial contents to confirm the summaries of the contents before obtaining the contents,
- a contents distribution element which conducts streaming-distribution of at least said trial contents,
- a detection element which detects and outputs a degree of a user's interest in said trial contents,
- a contents estimation value determination element which determines and outputs an estimation value of said trial contents based on the output of said detection element, and
- an update element which updates estimation of contents on said Web site based on the output of said contents estimation value determination element, wherein said client side device comprises:
- an element which automatically transmits a trial contents reproduction stop signal to said data contents distribution server, when said client side device stops reproduction of trial contents received from the Web site,
- wherein said detection element in said distribution server recognizes a reproduction time of said trial contents when said detection element detects the reproduction stop signal, and the detection element detects the degree of user's interest in said trial contents based on the reproduction time of said trial contents.

* * * * *